United States Patent [19]

Leon

[11] Patent Number: 5,013,204

[45] Date of Patent: May 7, 1991

[54] INTERFACE CONTROL AND STOP MEANS FOR AIRCRAFT CARGO LOADER PLATFORM

[75] Inventor: Michael A. Leon, Orlando, Fla.

[73] Assignee: FMC Corporation, Chicago, Ill.

[21] Appl. No.: 380,363

[22] Filed: Jul. 17, 1989

[51] Int. Cl.[5] .......... B65F 9/00

[52] U.S. Cl. .......... 414/347; 414/495; 187/18

[58] Field of Search .......... 414/347, 349, 391, 392, 414/396, 401, 495, 536; 187/35, 36, 18

[56] References Cited

U.S. PATENT DOCUMENTS 3,489,300 1/1970 McCartney et al. .......... 414/347 X
4,304,518 12/1981 Carder et al. .......... 414/495
4,662,809 5/1987 Sturtz et al. .......... 414/495 X
4,886,413 12/1989 Leon .......... 414/495

FOREIGN PATENT DOCUMENTS 221729 12/1983 Japan .......... 414/495

*Primary Examiner*—H. Grant Skaggs
*Assistant Examiner*—Keith L. Dixon
*Attorney, Agent, or Firm*—Douglas W. Rudy; Richard B. Megley; J. Preston Oxenbam

[57] ABSTRACT

Interface control for controlling the altitude of two roll planes of a deck surface relative to each other and providing cooperation with a stop that precludes the lowering of one of the roll planes when a load is in position on the deck surface.

12 Claims, 4 Drawing Sheets

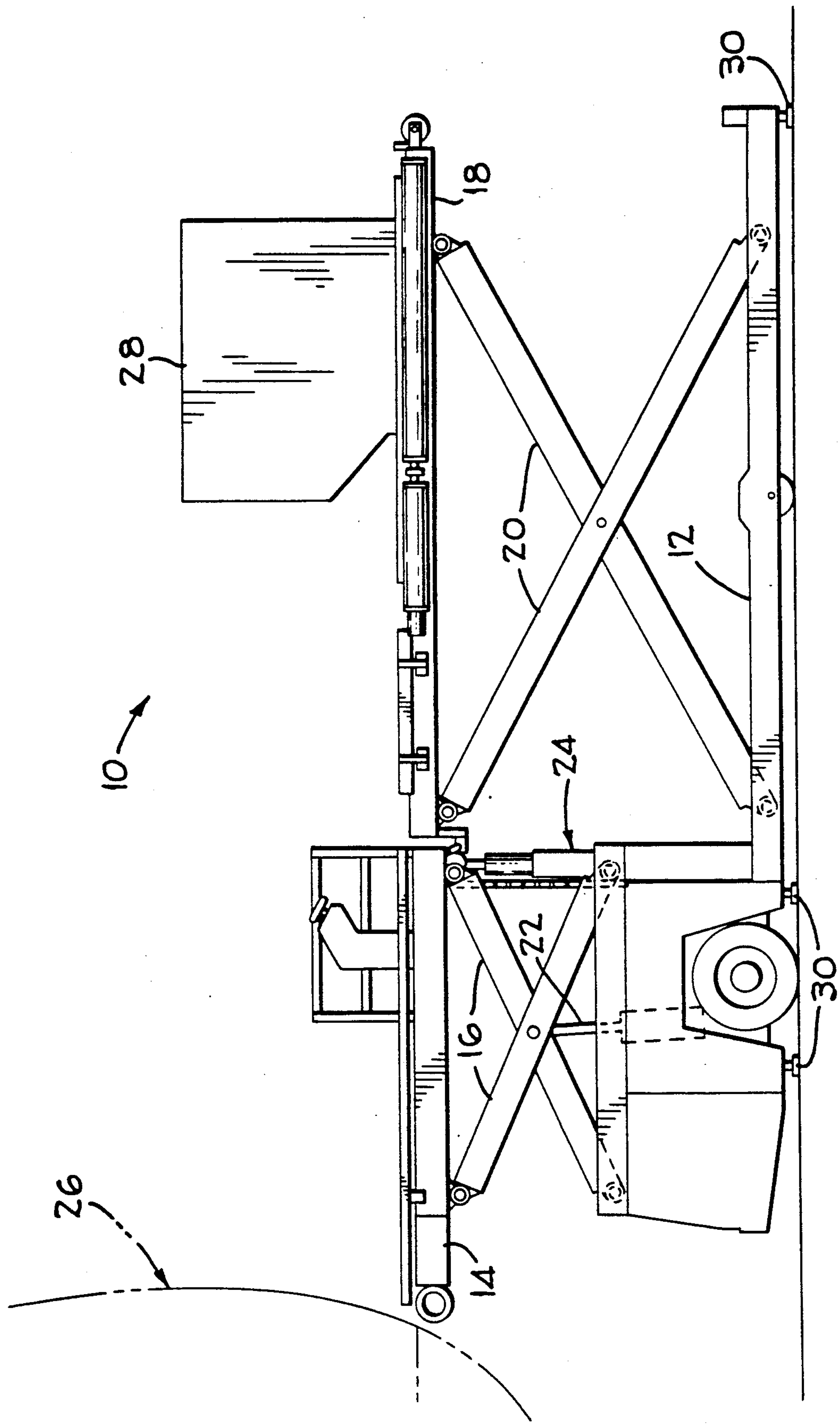
FIG_1

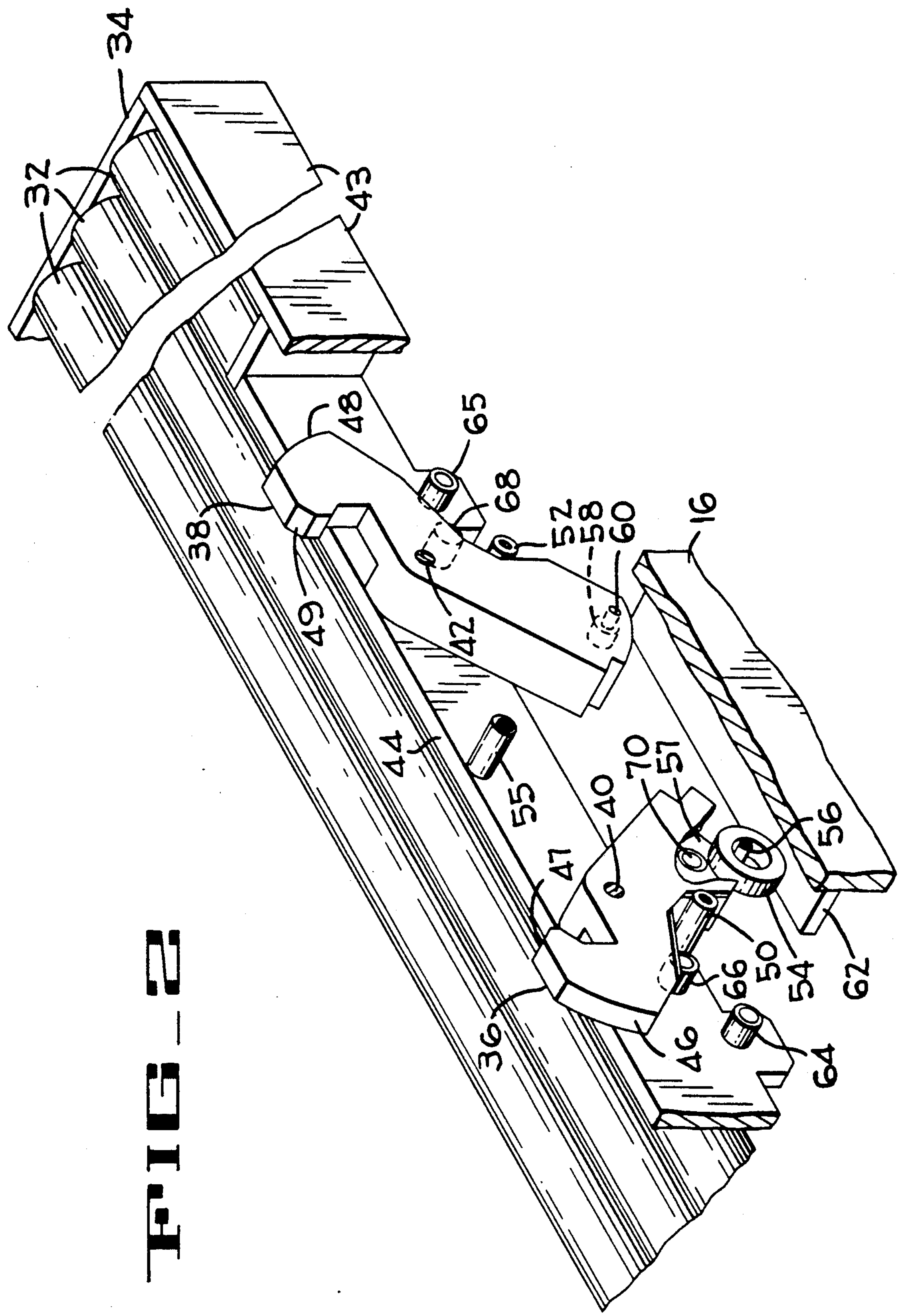
FIG_2

FIG_3
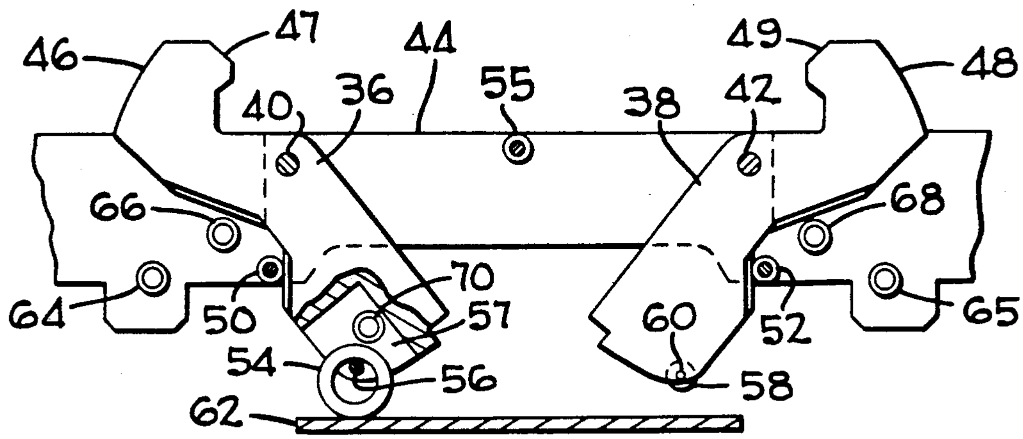
FIG_4
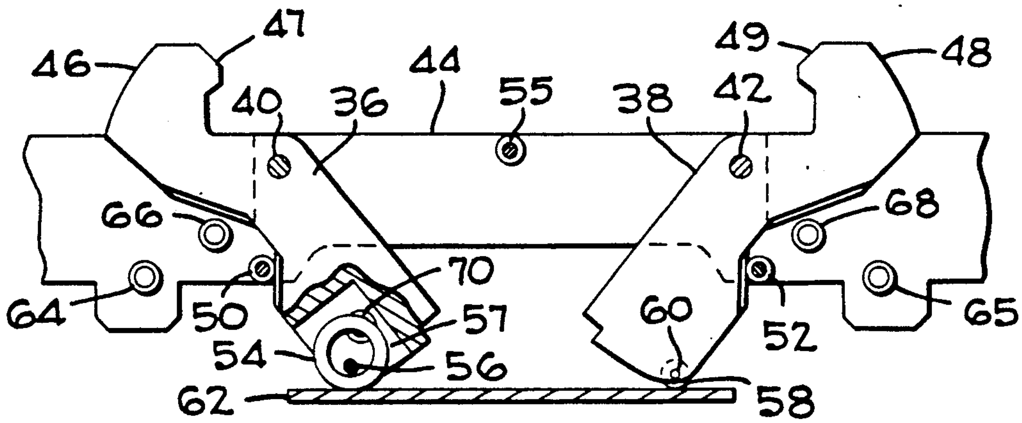
FIG_5
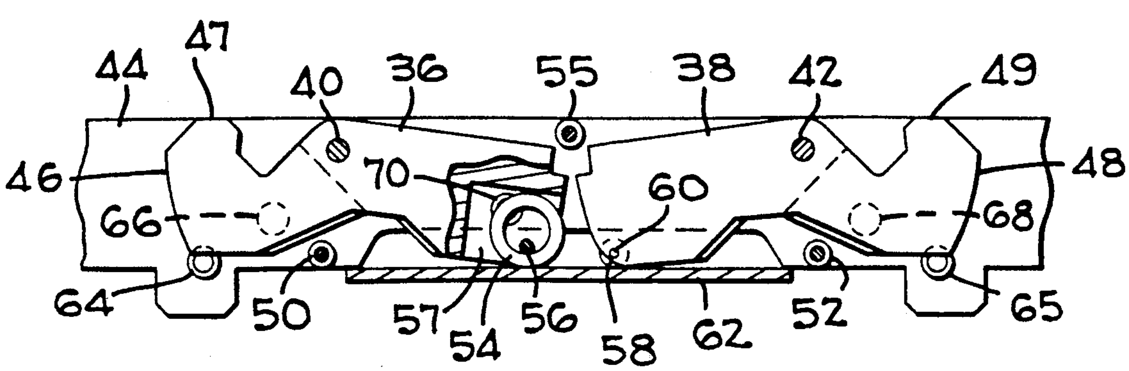

FIG_6
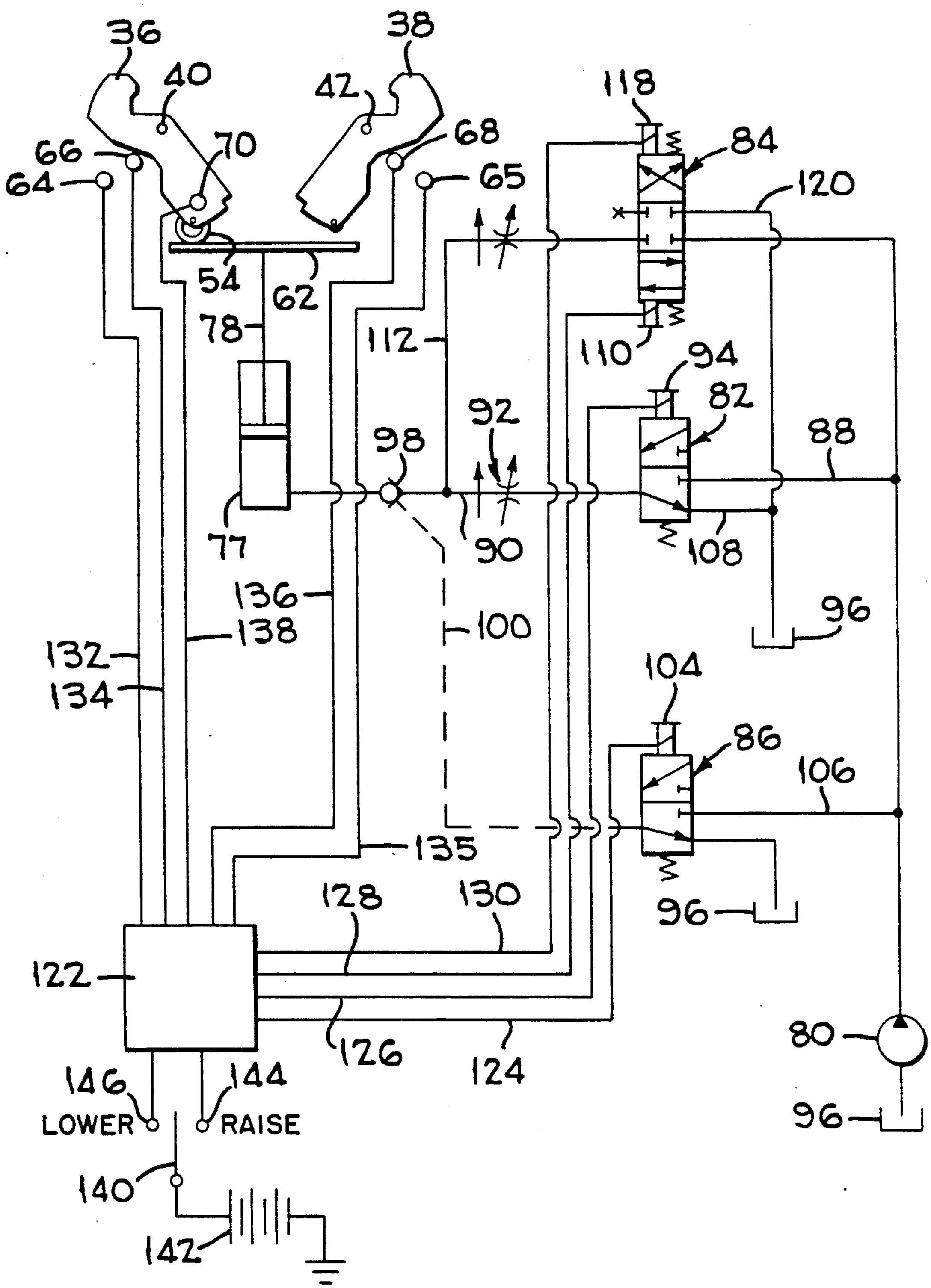

INTERFACE CONTROL AND STOP MEANS FOR AIRCRAFT CARGO LOADER PLATFORM

This invention relates generally to an interface means for controlling the movement of the rear platform of an aircraft cargo loader as well as a stop means associated with the front platform thereof to limit the rearward travel of cargo containers on the front platform when the rear platform is not substantially at the same elevation.

An aircraft cargo loader is a self-propelled vehicle having elevatable front and rear platforms, each platform having powered rollers, belts or other means for transporting containers or pallets toward or away from a cargo door on the aircraft. The operator drives the loader to a position generally aligned with and adjacent to the cargo door, attaches to the door sill and renders the vehicle stationary by lowering stabilizers carried by the vehicle to the ground. The front platform may be a self-supporting type in which case the attachment is a mechanism to sense relative movement between the door sill and the front platform and actuate hydraulic valves to power the platform up or down in response to movement of the aircraft. In some cases the front platform is of the type in which the forward end thereof is physically supported by the plane and it follows the vertical movement of the door sill merely by changing its angle. The front platform is used herein to refer to both types. The unloading and loading of containers and pallets, both of which are referred to as cargo loading, are performed while passengers are leaving and entering the plane and while materials, such as fuel, water, food and beverage supplies, are added and other materials such as waste are removed. Because the aircraft is supported on oleo-pneumatic springs, the elevation of the plane moves a relatively small, but still significant, amount vertically throughout the cargo loading operation. Individual containers are transferred between the front platform, which remains essentially at the elevation of the cargo door sill, and the rear platform which is cycled between an elevation matching the front platform and a lower elevation matching the roll plane of trailers individually positioned adjacent to the lower platform to receive containers therefrom or to discharge containers thereto. While the rear platform is elevated, its roll plane must match that of the front platform, which is changing, so that containers may be smoothly transferred therebetween. This matching of the two roll planes is often referred to as the interface condition, or simply interface.

The present invention provides an interface control means which automatically achieves and maintains interface when the rear platform is elevated, which permits interface to be achieved quickly and smoothly, and which senses and cooperates with stop means to preclude lowering the rear platform when a container is astraddle the platform.

These and other attributes of the present invention, and many of the attendant advantages thereof, will become more readily apparent from a perusal of the following description and the accompanying drawings; wherein:

FIG. 1 is a side elevational view of an aircraft cargo loader incorporating the present invention;

FIG. 2 is an isometric view of a portion of the interface control and stop means according to the present invention;

FIG. 3 is an elevational view of the interface control and stop means shown in FIG. 2 as the rear platform approaches these means;

FIG. 4 is a view similar to FIG. 3 in which the rear platform initiates the interface control means;

FIG. 5 is a view similar to FIGS. 3 and 4 with the platforms at interface; and

FIG. 6 is a simplified schematic of both a hydraulic circuit and an electrical logic circuit for practicing the invention.

Referring now to FIG. 1, there is shown an aircraft cargo loader, indicated generally at 10, having a self-propelled frame 12 with a front platform 14 supported on a pair of scissors, one of which is shown at 16, and a rear platform 18 also supported on a pair of scissors, one of which is shown at 20. The front scissors 16 are raised and lowered by one or more hydraulic rams 22 connected between the frame 12 and the intermediate pivot connection of the scissors 16. The rear platform is elevated by a chain and hydraulic ram lift mechanism 24, which preferably is of the type disclosed and claimed in U.S. Pat. No. 4,701,097 issued Oct. 20, 1987, but may be any type of lift mechanism capable of elevating the rear platform relative to the frame 12 to match the elevation of the front platform. The loader 10 is shown adjacent an aircraft, indicated generally at 26, and with the platforms at interface with a typical LD-3 container 28 on the rear platform. The stabilizers 30 are lowered to immobilize and stabilize the loader during the cargo loading operation.

A portion of the front platform 14 is shown in FIG. 2 and illustrates some of the typical powered rollers 32 rotatably mounted in the front platform frame 34. Left and right pivot arms 36 and 38 are pivotally mounted by pivot pins 40 and 42 respectively extending between the rear transverse member 43 of the frame 34 and a parallel support member 44 secured to the frame member 43. The pivot arms 36 and 38 have a reduced thickness portion 46 and 48 respectively which function as stop members. The center of gravity for the pivot arm 36 is to the right of pin 40 and to the left of pin 42 for the pivot arm 38, which causes stop members 46 and 48 to normally project above the roll-plane of the rollers 32 in order to retain containers on the front platform 14 unless the rear platform 18 is at or near interface. A pair of limit pins 50 and 52, attached between the members 43 and 44, are positioned to engage the arms 36 and 38 respectively and limit the angular movement of the arms under the influence of gravity. A similarly mounted pin 55, positioned to contact both arms 36 and 38, is provided merely to assure these arms are not bounced over center during transport of the loader. The lower end of the pivot arm 36 is provided with a slot 57 in which a roller flag 54 is loosely retained by a pin 56 bridging the slot 57. The inner diameter of the roller flag 54 is considerably greater than that of the pin 56. The roller flag 54 can therefore move vertically relative to pin 56 and the slot 57 as well as rotate or roll on the pin 56. The lower end of the pivot arm 38 is provided with a simple roller 58 rotatable on a pin 60. A slot in the arm 38 permits the roller 58 to rotate freely on the pin 60 while being held from transverse or lateral movement relative to the arm 38.

Arm 36 is provided with an inboard directed projection 47 on an upper portion of the arm.

The projection is such that it provides a radical projection rather than a smooth ramped surface on the inboard side of each of the pivot arms. The projection may have a significant cut out portion below the projection portion that could allow the ingress of a pallet frame or lower edge surface thereinto.

The radical projection will tend to engage an object directed against the radical projection where the object has a projecting edge.

A flat plate 62, or means for displacing the left and right pivot arms, is cantilevered from the lift mechanism or the rear platform and is positioned to engage the roller flag 54 and the roller 58 when the rear platform 18 is elevated. Four proximity switches 64, 65, 66 and 68 are mounted on the member 44 within an arc "swung" or covered by the left and right pivot arms and sense the position of the stop members 46 and 48. There are two proximity switches that can be covered by each of the pivot arms. Another proximity switch 70 is carried by the left pivot arm 36 and senses the position of the roller flag 54. The proximity switches 64, an interface detection means, and 66, a stop down sensing means, sense the position of the left stop member 46 and the switch 68 an interface detention means, and 65, a stop down sensing means, the position of the right stop member 48, as more fully explained hereinafter.

Referring now to FIG. 6, the lift mechanism 24 for the rear platform includes one or more hydraulic rams, indicated schematically by a hydraulic cylinder 76 having its cylinder rod 78 attached to the rear platform and capable of elevating and lowering it along with the flat plate 62. A hydraulic pump 80, driven in a conventional manner by an appropriate power source on the loader, is connected to supply hydraulic fluid under pressure to solenoid-actuated valves 82, 84 and 86. The valve 82 is a two position on/off valve and functions as the "low speed" valve. Fluid pressure from the pump 80 is supplied thereto through conduit 88 and conduit 90 connects the valve 82 with the head end of the cylinder 76. A pressure compensated, variable orifice 92 is interposed in the conduit 90 to provide a constant flow to the cylinder 76 under varying pressure conditions when the valve 82 is shifted downward, as viewed in FIG. 6, by energizing the solenoid 94 associated therewith. The valve 82 is normally spring biased to the position shown in FIG. 6, wherein the conduit 90 is in communication with the hydraulic reservoir 96. A load check or pilot operated check valve 98 is positioned in the conduit 90 adjacent the head end of the cylinder 76 and normally prevents collapse or contraction of the lift mechanism 24 by preventing flow of hydraulic fluid out of the cylinder 76. A pilot line 100 from the check valve 98 to the valve 86, which is also a two-position on/off valve, is normally connected to reservoir 96 through conduit 102. Energizing solenoid 104 of valve 86 will permit fluid to flow to reservoir 96 through unseated valve 98, conduit 90, valve 82 and conduit 108. Flow to the cylinder 76 to elevate the rear platform is achieved by energizing only the solenoid 94 of valve 82 and flow out of the cylinder 76 to lower the rear platform is achieved by energizing only the solenoid 104 of valve 86. In both cases the flow is through valve 82 and the orifice 92 controls the rate at which that flow occurs, hence providing a "slow" but uniform movement of the lift mechanism 24.

The valve 84 which is a three-position, center neutral valve, operates in parallel with the valve 82 and provides "high" speed movement of the rear platform. Energizing both solenoid 94 of valve 82 and solenoid 118 of valve 84 will provide a high speed elevation of the rear platform. In addition to the flow provided through orifice 92 as previously described, shifting the valve 84 upward will connect the conduit 112 with the conduit 114 which communicates with the pump 80. The conduit 112 connects with the conduit 90 between the orifice 92 and the check valve 98 so that the combined flows through valves 82 and 84 are provided to the head end of cylinder 76. A similar pressure compensated variable orifice 116 is interposed in conduit 112 to provide a relatively constant flow under varying pressure conditions. A fast lowering is achieved by energizing both the solenoid 104 of pilot valve 86 and the other solenoid 118 of valve 84. Energizing solenoid 118 causes valve 84 to shift downward placing the conduit 112 in communication with reservoir 96 through conduit 120. Since the check valve 98 is unseated by shifting valve 86, through energizing of solenoid 104, flow of hydraulic fluid from the cylinder 76 will be permitted through both valves 82 and 84 to reservoir 96 resulting in a fast lowering of the rear platform 18.

The control circuit for energizing the solenoids is represented schematically in FIG. 6 as a logic device 122 which is connected by conductors, or electrical conduit means, 124, 126 128, and 130 to solenoids 104, 94, 110 and 118 respectively and by conductors 132, 134, 135, 136, and 138 to proximity switches 64, 66, 65, 68 and 70 respectively. An operator-controlled input switch 140, which returns to neutral position, as shown, when released by the operator, is connected with a battery 142 and has two poles or contacts, representing raise and lower commands for the rear platform, connected through conductors 144 and 146 to the logic device 122. A RAISE command will cause the logic device 122 to energize both the solenoids 94 and 110 through conductors 126 and 130 respectively. Both valves 82 and 84 will be shifted to direct hydraulic flow to the cylinder 76 thereby providing a rapid elevating of the rear platform. When the plate 62, which is moving with the rear platform 18, moves the roller flag 54 upward to cover the proximity switch 70, as shown in FIG. 4, a signal will be transmitted through conductor 138 to the logic device, which will cause the solenoid 110 to be deenergized. The valve 84 will return under the influence of its spring bias to its center neutral position as shown in FIG. 6. Flow to the cylinder 76 will subsequently be provided by the valve 82 only and the upward movement of the rear platform will continue at a slower rate until the right stop member 48 begins to cover the proximity switch 68. When this occurs, the signal provided through conductor 136 will cause the logic device 122 to deenergize the solenoid 94. With no flow to the cylinder 76, upward movement of the rear platform will cease. The proximity switch 68 is positioned so that the aforementioned signal is provided when the platforms are at interface, as shown in FIG. 5. The proximity switch 64 and 65 will be fully covered, but the signal provided therefrom is not effective in the control device 122 unless the input signal from switch 140 is a LOWER command. Once interface has been achieved the logic device 122 will deenergize all solenoids and the rear platform will be relatively located in position, i.e., the rear platform will move up or down to maintain interface whether procurement of the front platform is the result of operator command or because the front platform is adjusting to aircraft movement. If the rear platform overshoots the front platform, i.e., moves to an elevation wherein the roll-plane of the rear platform is higher than that of the front platform, the excessive upward movement of the plate 62 will cause the right pivot arm 38 to rotate clockwise, as viewed in FIGS. 2–6, until the right stop member 48 begins to cover proximity switch 68 sending a signal to the logic device 122. The logic device will immediately switch to slow lower by energizing only solenoid 104. The valve 86 will unseat check valve 98 and the rear platform will lower until the switch 66 is totally uncovered. In the absence of a signal from switch 68, the logic device will deenergize solenoid 104, at which point the switch 68 should remain partly covered and still generate a signal for the logic device 122 to deenergize all solenoids because the platforms are at interface. Should the front platform move up relative to the rear platform, due to aircraft movement, the left pivot arm will rotate clockwise uncovering switch 66 providing combined signals, switch 66 uncovered or off and switch 70 covered or on, that will cause the logic device 122 to energize only solenoid 94 providing slow raise for the rear platform. If during an adjustment to maintain interface, the front platform moves upward, but the rear platform in following that movement moves at a faster rate, the right stop member would be pivoted to begin covering the switch 68, which would stop further movement of the rear platform until relative upward movement of the front platform resulted in the switch 68 being uncovered.

When the control switch 140 is moved to the LOWER command position, the logic device 122 initially sees all three switches 64, 65, and 70 covered or on, assuming the platforms are at interface. Under this condition, the logic device 122 will energize only solenoid 104 permitting a slow lowering of the rear platform. The stop members 46 and 48 will rotate upward, under the influence of gravity, causing the proximity switches 64 and 65 to be uncovered before the roller flag 54 can drop away from the switch 70. The slow rate will continue until switches 64, 65, and 70 are uncovered. When that condition appears, the logic device will additionally energize solenoid 118 which permits fast lowering of the rear platform. If the switch 70 is uncovered and the switch 64 or 65 remains covered, the logic device 122 will immediately deenergize all solenoids stopping any further lowering of the rear platform. The uncovering of switch 70 is possible only when the roller flag 54 has dropped away from the left pivot arm, but the switches 64 and 65 can be covered only if the stop member 46 and 48 have not pivoted to their upright operative positions. This set of conditions occur when a container is positioned to prevent the stop member from swinging to its upright position.

The roller flag 54 is loosely mounted in the slot 57 so that it may move up and down as well as rotate on the pin 56. Vibration and bouncing of the loader 10 during loading operations may cause the roller flag to give false indications to the logic device because it may partially cover the proximity switch 70. In order to minimize this effect, the roller flag 54 is made of a bronze material to which the switch 70 is less sensitive. A preferred material is Oilite bearing material because it has the desired lack of sensitivity and is self-lubricated to facilitate rotation.

This invention has been described, for clarity, in connection with a simple logic device, which could be either a simple microprocessor suitably programmed, as outlined above, or solid state logic circuit, but would be equally effective using conventional relays. While one embodiment has been illustrated and described herein, various changes and modifications may be made therein without departing from the spirit of the invention as defined by the scope of the appended claims.

what is claimed is:

1. Interface interlock means for use on an aircraft cargo loader including a front platform having a roll plate surface an elevatable rear platform, said interface interlock comprising:

a left pivot arm pivotally attached to said front platform at a pivotal attachment point and having a center of gravity relative to said pivotal attachment point to cause said pivot arm to normally project above the plane surface of said front platform in a normal position;

means for displacing said left and said right pivot arms from said normal position to a second position where said pivot arms do not project above said roll plane of said front platform.

first and second left proximity switch means for generating proximity signals carried on said front platform within an arc which may be covered by said left pivot arm and first and second proximity switch means for generating proximity signals carried on said front platform within an arc which may be covered by said right pivot arm;

logic means; for receiving said proximity signals and generating control signals lift means for reasoning said control signals and raising and lowering said elevatable rear platform in response to control signals.

2. The invention in accordance with claim 1 wherein said first left proximity switch means is a stop down sensing means for generating a proximity signal indicating when said left pivot arm is pivoted to said second position.

3. The invention in accordance with claim 1 wherein said first right proximity switch means is a stop down sensing means for generating a proximity signal indicating when said right pivot arm is pivoted to said second position.

4. The invention in accordance with claim 2 wherein said second left proximity switch means is an interface detection means for generating a proximity signal indicating when said left pivot arm is pivoted to said second position.

5. The invention in accordance with claim 3 wherein said second right proximity switch means is a platform down detection means for generating a proximity signal indicating when said right pivot arm is normal position.

6. The invention in accordance with claim 1 wherein: arm is in said normal position.

7. The invention in accordance with claim 6 further comprising:

roller flag proximity switch means for generating a roller flag proximity signal, said roller flat proximity switch means carried on a lower part of said left pivot arm means; and, a roller flag carried on a lower portion of said left pivot arm and movably mounted so as to cause said roller flag proximity switch means to generate a roller flag proximity signal indicating when said elevatable rear platform approaches interface with said front platform.

8. The invention in accordance with claim 7 wherein said logic means is adapted to receive said roller switch signal.

9. The invention in accordance with claim 1 wherein said left pivot arm has an inboard directed projection on an upper portion of said pivot arm.

10. The invention in accordance to claim 1 wherein said right pivot arm has an inboard directed projection on an upper portion of said pivot arm.

11. The invention in accordance with claim 9 wherein said projection provides a radical projection above said roll plane of said front platform when said pivot arm is in said normal position.

12. The invention in accordance with claim 9 wherein said right pivot arm has an inboard directed projection on an upper portion of said pivot arm.

* * * * *